United States Patent [19]

McMillen

[11] Patent Number: 4,712,805
[45] Date of Patent: Dec. 15, 1987

[54] FLEXIBLE MOUNTING FOR SPLASH/SPRAY CONTROL GUARDS AND THE LIKE

[76] Inventor: Russell G. McMillen, c/o Suntron Corporation, P.O. Box 11426, Fort Wayne, Ind. 46858

[21] Appl. No.: 839,439

[22] Filed: Mar. 13, 1986

[51] Int. Cl.$^4$ .............................................. B62D 25/16
[52] U.S. Cl. ............................ 280/154.5 R; 248/635; 403/187; 403/222; 403/377
[58] Field of Search ............... 280/154.5 R; 160/332; 403/109, 377, 187, 188, 201, 222, 226, 221, 223, 225, 228, 224, 350, 351; 248/635

[56] References Cited

U.S. PATENT DOCUMENTS

| 1,859,038 | 5/1932 | Irgens | 403/227 |
|---|---|---|---|
| 2,456,480 | 12/1948 | Austin | 403/228 |
| 2,724,770 | 11/1955 | Onksen, Jr. | 403/225 |
| 2,797,929 | 7/1957 | Herbenar | 403/228 |
| 2,823,771 | 2/1958 | Langheck | 403/201 |
| 2,827,303 | 3/1958 | Herbenar | 403/228 |
| 2,993,715 | 7/1961 | Hutton | 403/227 |
| 3,224,791 | 12/1965 | Sogoian | 280/154.5 R |
| 3,837,672 | 9/1974 | Molby | 280/154.5 R |
| 3,904,300 | 9/1975 | Hetmann | 403/224 |
| 3,940,165 | 2/1976 | Sogoian | 280/154.5 R |
| 3,999,776 | 12/1976 | Betts, Sr. | 280/154.5 R |
| 4,180,230 | 12/1979 | Sogoian | 280/154.5 R |
| 4,377,294 | 3/1983 | Lockwood et al. | 280/154.5 R |
| 4,453,728 | 6/1984 | Verge | 280/154.5 R |

FOREIGN PATENT DOCUMENTS 786893 9/1935 France ............................ 403/225

Primary Examiner—David M. Mitchell
Assistant Examiner—Eric D. Culbreth
Attorney, Agent, or Firm—Wood, Dalton, Phillips, Mason & Rowe

[57] ABSTRACT

A flexible mount for resiliently securing a first member to a second member so that the first member can be deflected relative to the second member in response to an applied force and so that the first member returns to an equilibrium position when the applied force is removed includes an elongate stud having a center axis and a nut threadably engaged on one end of the stud for securing same to the second member and a body of elastomeric material encapsulating and joined to the other end of the elongate stud. The body of elastomeric material includes a body center axis disposed at a small angle with respect to the stud center axis and a tab for securing the first member to the body.

21 Claims, 8 Drawing Figures

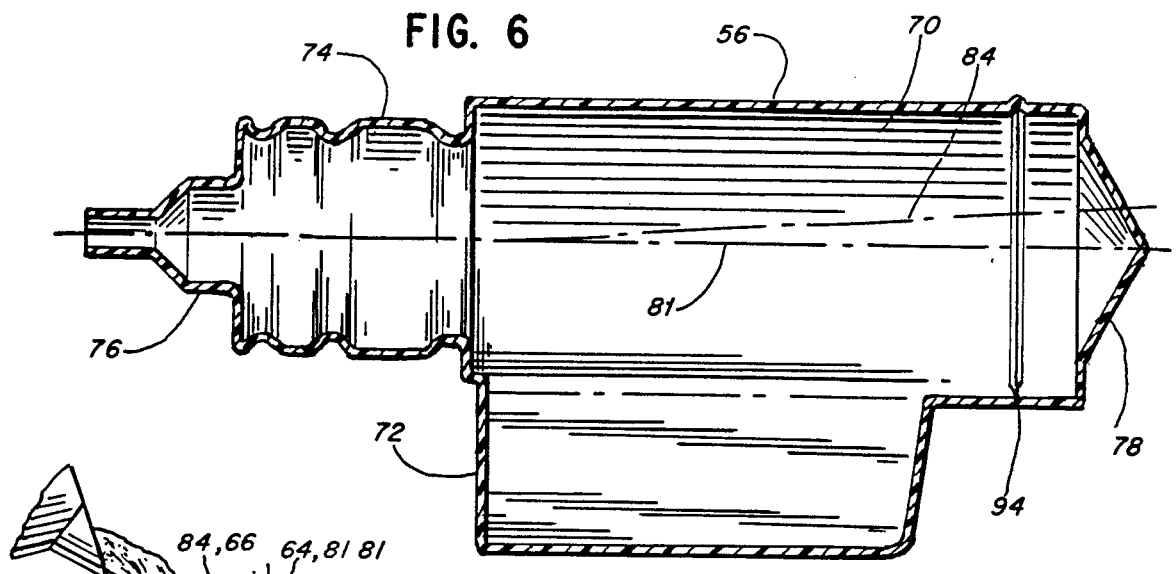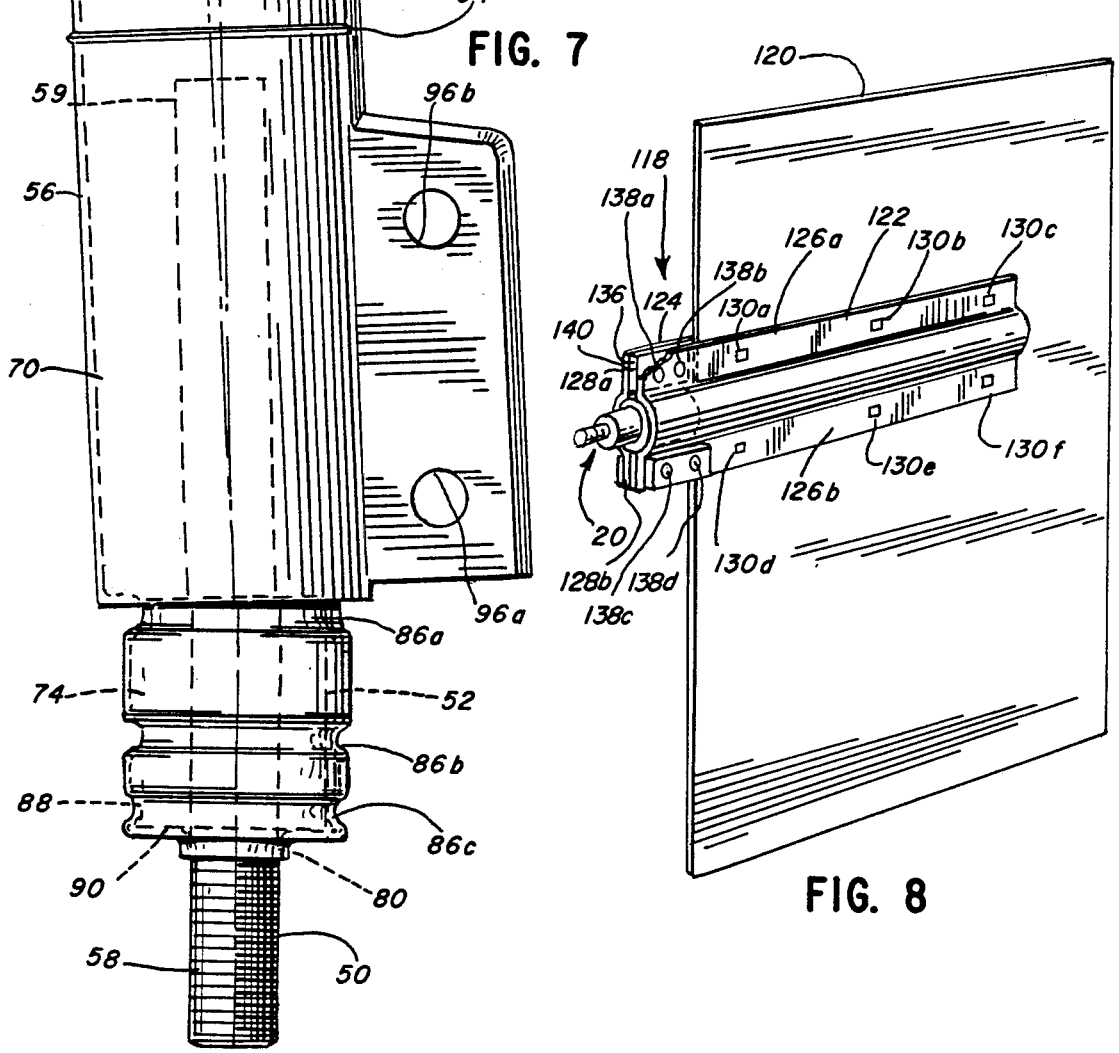

FLEXIBLE MOUNTING FOR SPLASH/SPRAY CONTROL GUARDS AND THE LIKE

TECHNICAL FIELD

The present invention relates generally to mounting apparatus and methods and more particularly to a flexible mount and a method of making same.

BACKGROUND ART

Flexible mounts are often used to secure one member to another wherein one of the members is subject to an applied force which causes same to deflect relative to the other member. For example, such a mount may be used to resiliently secure a splash/spray control guard, such as a splash/spray guard or splash/spray fender to the body of a vehicle. The applied force may result from movement of the vehicle which causes the splash/spray control guard to come into contact with a stationary object. In this case, the mount should be sufficiently resilient to cause the splash/spray control guard to return to its original installed position once the applied force is removed.

Most prior types of flexible mounts utilize springs to provide the desired flexibility. However, springs typically have a short life in such applications and require a great deal of service. Also, the spring stiffness is typically such that the guard bounces continually as the vehicle is traveling, in turn resulting in fatigue damage. Moreover, these mounts typically rely solely upon the spring itself to mount the splash/spray control guard on the body of the vehicle. Thus, when the spring fails the entire splash/spray control guard assembly detaches from the vehicle body which may result in a safety hazard.

A different type of prior art flexible mounting developed by the assignee of the instant application utilizes a threaded stud or bolt which is secured at a first end to a vehicle body, a cylindrical body of elastomeric material disposed on a second end of the stud wherein a spacer is disposed between the body of the vehicle and the elastomeric material, a metallic sleeve surrounding the body of elastomeric material and a nut threaded on a second end of the stud for compressing the elastomeric material. A splash/spray control guard is secured to a tube which is clamped over the sleeve and the body of elastomeric material to mount the splash/spray control guard on the vehicle. The body of elastomeric material permits the splash/spray control guard to be deflected relative to the vehicle body and provides sufficient resilience to return the splash/spray control guard to the original installed position once an applied force is removed therefrom.

SUMMARY OF THE INVENTION

In accordance with the present invention, a flexible mount for resiliently securing a first member, such as a splash/spray control guard, to a second member, such as a vehicle body, accomplishes mounting of the first body in a level condition and affords the necessary flexibility to permit relative movement betewen the first and second members in response to an applied force whereby the members are returned to their original installed relative positions when the applied force is removed therefrom.

In a more narrow sense, the present invention comprehends a splash/spray control system utilizing the flexible mount.

The present invention also comprehends a method of making such a flexible mount, which method is simple and economical and results in a mount having long life and little required maintenance.

The flexible mount includes an elongate stud having a center axis and means disposed at one end of the stud for securing the stud to the second member. A body of elastomeric material encapsulates and is joined to the other end of the elongate stud wherein the body includes a body center axis disposed at a small angle with respect to the stud center axis. The body of elastomeric material further includes means for mounting the first member to the body, such means comprising a tab depending from a cylindrical main portion of the body. The tab includes at least one aperture therein for accepting a bolt to secure the first member to the tab.

When the flexible mount of the present invention is utilized to mount a splash/spray control guard on the body of a vehicle, the splash/spray control guard is secured to the tab by means of bolts while the elongate stud is attached to the body by means of a nut secured to threads on the stud which extend through a portion of the vehicle body. The small angle between the center axis of the elastomeric body and the stud center axis compensates for the weight of the splash/spray control guard on the body of elastomeric material so that the splash/spray control guard, in the absence of applied forces thereto, is in a substantially level equilibrium position.

The body of elastomeric material is preferably made of polyurethane which is sufficiently stiff to reduce bounce to a minimum yet permit the required degree of flexibility to allow the splash/spray control guard to be moved from its equilibrium position and return thereto.

The method of making the flexible mount according to the present invention includes the steps of fabricating a hollow shell having a cylindrical collar at a first end having a collar axis, a cylindrical main portion at a second end having a main portion axis which forms a small angle with respect to the collar axis and a hollow auxiliary shell portion extending outwardly from the main portion. The method further comprises the steps of inserting a threaded stud through a first opening at the first end of the shell so that the stud extends at least into the interior of the collar whereby the stud center axis is coincident with the collar axis and the threads of the stud are exposed outside of the shell and using the shell as a mold to form the body of elastomeric material about the portion of the stud within the shell so that the body center axis is disposed at the desired small angle with respect to the stud center axis and so that the tab is formed within the auxiliary shell portion.

Subsequent to the above steps, the collar may be removed from the shell and apertures may be formed in the shell and tab for securing the splash/spray control guard thereto.

BRIEF DESCRIPTION OF THE DRAWINGS

FIG. 6 is a sectional view taken generally along the line 6—6 of FIG. 5 illustrating the shell of the flexible mount before the elongate stud and body of elastomeric material are placed within;

FIG. 7 is an elevational view, partly in phantom, of the assembled shell and threaded stud during formation of the body of elastomeric material; and FIG. 8 is a perspective view of an alternative splash/spray control system according to the present invention.

DESCRIPTION OF THE PREFERRED EMBODIMENT

Figure 1:
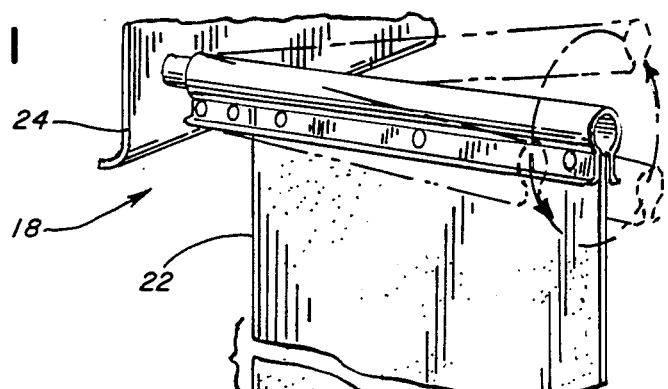
FIG. 1 is a fragmentary perspective view of a splash/spray control system comprising a flexible mount for securing a splash/spray control guard to the body of a vehicle.
Figure 2:
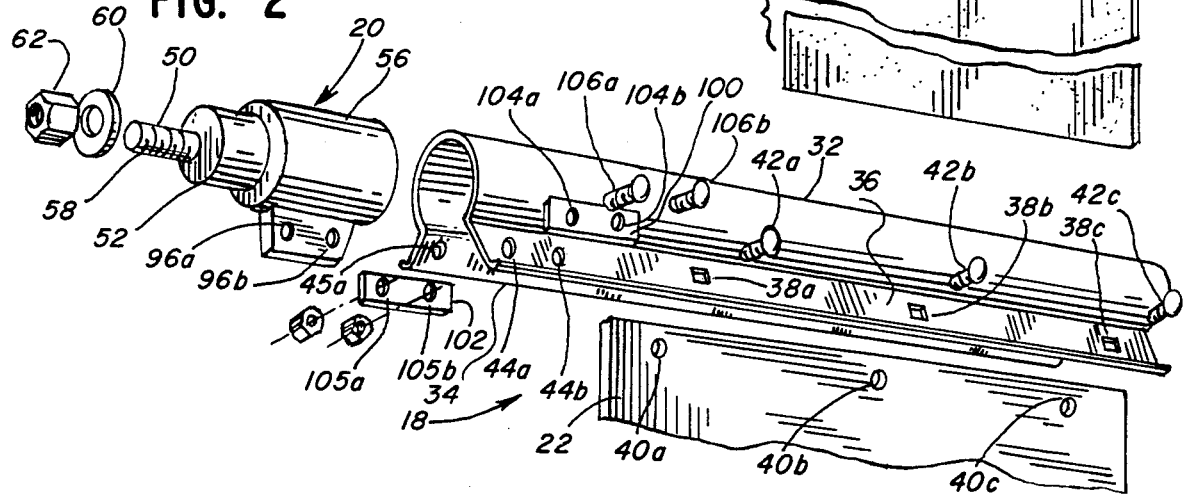
FIG. 2 is an exploded fragmentary perspective view illustrating the various parts of the flexible mount and splash/spray control guard illustrated in FIG. 1.

Referring now to FIGS. 1 and 2, there is illustrated a splash/spray control system 18 which utilizes a flexible mount 20 for securing a first member 22, such as a splash/spray control guard to a second member, such as a portion 24 of a body of a vehicle (not shown). The splash/spray control guard 22 may be a mud flap, a splash/spray fender, or any other device. The portion 24 may comprise a structural member of a truck or other vehicle.

The flexible mount 20 permits the splash/spray control guard 22 to be deflected relative to the member 24 when a force is applied to the control guard 22. The flexible mount 20 causes the control guard 22 to return to the equilibrium position shown by the solid line representation of FIG. 1 once the applied force is removed.

Referring specifically to FIG. 2, the splash/spray control system 18 includes a cylindrical split tube 32 having first and second mounting flanges 34,36. A plurality of apertures 38a-38c are disposed in the mounting flange 36. A corresponding plurality of apertures (not visible in the figures) are disposed in the flange 34 and are aligned with the apertures 38a-38c. These apertures are also aligned with a series of apertures 40a-40c in the guard 22. The guard 22 is inserted in the space between the mounting flanes 34,36 and bolts 42a-42c extend through the aligned apertures in the flanges 34,36 and the guard 22. Nuts (not shown) may be threaded onto the bolts 42 to secure the guard 22 to the split tube 32.

The split tube 32 further includes at least one, and preferably two additional apertures 44a, 44b in the flange 36. A further aperture 45a and an associated aperture, not visible in the figures, are disposed in the flange 34 and are aligned with the apertures 44a, 44b. These apertures are used to secure the split tube 32 to the flexible mount 20, as noted more specifically below.

Figure 3:
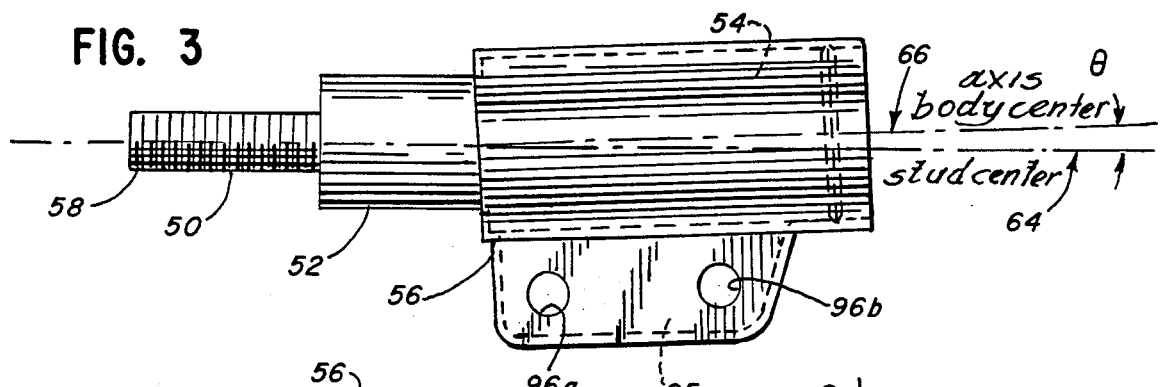
FIG. 3 is a elevational view of the flexible mount shown in FIG. 2.
Figure 4:
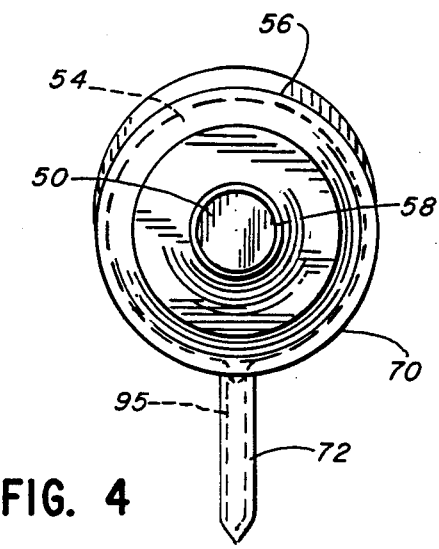
FIGS. 4 and 5 are end elevational views of the flexible mount shown in FIGS. 2 and 3.
Figure 5:
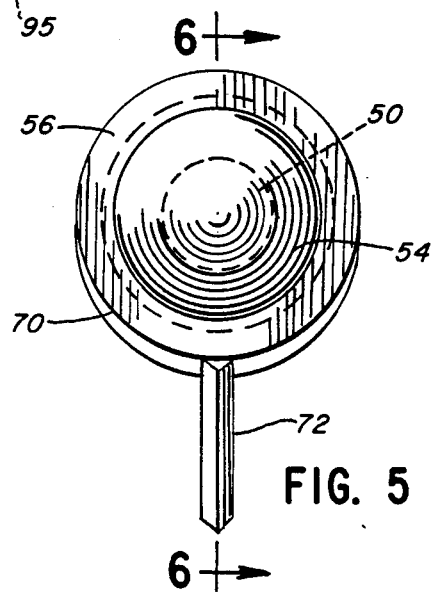

Referring also to FIGS. 3-5, the flexible mount 20 includes an elongate stud 50, a metallic spacer 52 disposed on the stud 50 and a body of elastomeric material 54 which is disposed within a shell 56. The elongate stud 50 includes a first end 58 which is threaded to accept a washer 60 and lock nut 62 for securing the flexible mount 20 to the portion 24 of the vehicle body. The threads may also be used to secure the spacer 52 on the stud 50, or the spacer may be joined thereto in any other suitable fashion.

The threaded stud 58 includes a second end 59 (shown in dotted form in FIG. 7) which is encapsulated by and joined to the elastomeric body.

Referring also to FIG. 3, the elongate stud includes a longitudinal center axis represented by the dashed line 64.

The body of elastomeric material 54 includes a body center axis represented by the dotted line 66 which forms a small angle $\theta$ with respect to the stud center axis 64. In the preferred embodiment, the angle $\theta$ is a small angle other than 0° and is on the order of 1°. This angle causes the elastomeric body to tilt upwardly when the flexible mount is installed on the vehicle body before the splash/spray control guard or other load is secured thereto.

However, when the split tube and attached guard 22 are secured to the resilient mount 20, the weight of these structures compresses the elastomeric body downwardly so that the split tube and guard attached thereto are substantially level.

Referring now to FIGS. 6 and 7, there is illustrated the shell 56 which surrounds the body of elastomeric material 54. The shell is fabricated of high density polyethylene which is initially formed to the shape shown in FIG. 6. The shell includes a hollow cylindrical main shell portion 70 and a hollow auxiliary shell portion 72 which extends outwardly from the main shell portion 70. The main shell portion is cylindrical in shape while the auxiliary shell portion 72 is substantially planar in cross-section.

Disposed at one end of the main shell portion is a hollow collar 74 which is cylindrical in cross-section.

The shell 56 is formed with a nipple 76 at a first end thereof and a cone-shaped projection 78 at a second end thereof.

Referring specifically to FIG. 7, the shell 56 is prepared for use by removing the projection 78 and a portion of the nipple 76. A small flange 80 may be left behind after removal of the nipple 76.

The cylindrical collar 74 has a collar axis 81 which forms a small angle with respect to a main portion axis 84 of the main shell portion 70. In fact, this angle, as noted below, is the same angle between the body center axis 66 and the stud center axis 64 described previously.

Once the projection 78 and nipple 76 are removed from the shell 56, the stud 50 with the spacer 52 assembled thereon is placed within the shell so that the first or threaded end 58 of the stud 50 extends outwardly from the flange 80 and the remainder of the stud and the spacer 52 extend into at least the collar 74, and preferably into the main shell portion 70 of the shell 56. As seen in FIG. 7, the spacer 52 has an outer diameter which is roughly equal to the inner diameter of inwardly directed grooves 86a, 86b, 86c in the collar 74. These grooves provide an interference fit with the spacer 52 so that the spacer and stud 50 are firmly retained within the shell 56.

Once the spacer 52 is firmly seated within the collar 74 such that an end face 88 of the spacer 52 abuts squarely on an end wall 90 of the collar 74, the stud center axis 64 is substantially coincident with the collar axis 81. Hence, the stud center axis 64 forms a small angle with respect to the main portion axis 84 of the shell 56.

Once the stud 50 and shell 56 are assembled as shown in FIG. 7, a polyurethane or other elastomeric material is poured inside the shell 56 through the hole formed by removal of the projection 78. Enough elastomeric material is deposited in the shell 56 so that the end 59 of the stud 50 opposite the end 58 is encapsulated by the elastomeric material. The shell 56 may be filled to a height indicated by a fill line 94 which is formed in the shell 56.

It should be noted that the end 59 of the stud 50 which is surrounded by the elastomeric material may be threaded, if desired.

Once the elastomeric material is poured into the shell 56 to the proper level, the material is cured so that it adheres tightly to the stud 50.

Once the elastomeric material is cured, the collar 74 may be removed from the assembled pieces so that the spacer 52 is exposed, if desired.

It can be seen that the body of elastomeric material, once formed within the shell 56, has its body center axis 66 coincident with the main portion axis 84 of the shell. This means that the stud center axis 64 and the body center axis 66 are disposed at the small angle with respect to one another as noted above.

A tab 95 is formed within the auxiliary shell portion 72, which tab extends outwardly from the main body portion. Following curing of the elastomeric material, at least one and preferably two holes 96a, 96b are drilled or otherwise formed in the tab 95 and the auxiliary shell portion 72. Referring again to FIG. 2, the holes 96a, 96b align with the holes 44a, 44b in the flange 36 and the corresponding hole 45a and the nonvisible hole associated therewith in the flange 34 once the resilient mount 20 is assembled within the split tube 32. A pair of clamp plates 100,102 each with apertures 104a, 104b and 105a, 105b, respectively, which are aligned with the apertures 44a, 44b, 45a, 45b and the holes 96a, 96b are disposed on the flanges 34,36. Bolts 106a, 106b extend through the aligned apertures 104a, 44a, 96a, 45a, 106a and 104b, 44b, 96b, the nonvisible aperture, 106b and nuts (not shown) are threaded thereon to secure the split tube 32 to the flexible mount 20. The clamp plates 100,102 provide even clamping force on the flanges 34,36, the auxiliary shell portion 72 and the tab 95.

Referring now to FIG. 8, there is illustrated an alternative embodiment of the invention which may be utilized to secure an alternative splash/spray control system 118 to the body of a vehicle. This embodiment utilizes the flexible mount 20 disclosed above to resiliently secure a splash/spray control guard in the form of a one-piece flap 120 which extends above and below its point of connection to the vehicle body. The one-piece flap is attached to the flexible mount by means of first and second identical tube halves 122,124. Both of the tube halves 122,124 include first and second flanges 126a, 126b and 128a, 128b, respectively. Holes 130a–130f are disposed in the flanges 126a, 126b. Corresponding holes (not visible) are disposed in the flanges 128a, 128b and in the flap 120 in alignment with the holes 130a–130f.

It should be noted that each of the tube halves 122,124 may be formed by flattening the split tube 32 shown in FIG. 2 so that the flanges 34,36 lie in approximately the same plane.

Each of the halves 122,124 includes an extension portion, indicated generally at 136 which extends laterally beyond the terminus of the flap 120. Additional holes 138a–138d are disposed in the flanges 126a, 126b in the extension 136 of the tube half 122. A series of four additional holes are disposed in the flanges 128a, 128b in the extension 136 of the tube half 124 in alignment with the holes 138.

The flap 120 is secured to the tube halves 122,124 by means of bolts (not shown) extending through the aligned holes in the flanges 126a, 126, 128a, 128b and the flap 120. The tube halves are then slid over the flexible mount 20 so that the holes 138c, 138d are aligned with the holes 96b, 96a, respectively in the tab 72 of the flexible mount 20. A spacer plate 140 having mounting apertures therein in alignment with the apertures 138a, 138b is inserted in the space between the flanges 126a, 126b in the extension 136 above the flexible mount 20. Bolts (not shown) are passed through the aligned apertures in the clamp plates 100,102, the extension 136, the tab 95, and the spacer plate 140. Nuts are then threaded on the ends of the bolts to secure the entire assembly together.

The one-piece flap 120 may then be secured to the body of the vehicle by means of the nut 62 and washer 60 shown in FIG. 2 as described above.

It should be noted that the thickness of the tab 72, the mud flap 120 and the spacer 140 are preferably substantially the same, although this need not be the case.

The one-piece flap 120 is thereby resiliently mounted on the vehicle body such that the flap 120 may be deflected in response to an applied force and will substantially return to an equilibrium position when the applied force is removed.

I claim:

1. A flexible mount for resiliently securing a first member to a second member wherein the first member can be deflected from an equilibrium position relative to the second in response for an applied force and wherein the first member returns substantially to the equilibrium position once the applied force is removed, comprising:
   an elongate stud having a center axis and means disposed at one end of the stud for securing the stud to the second member; and
   a body of elastomeric material encapsulating and joined to the other end of the elongate stud, the body including a body center axis disposed at an angle other than 0° with respect to the stud center axis and second means for securing the first member to the body wherein the body of elastomeric material includes a cylindrical main body portion and wherein the second securing means includes a tab extending outwardly from the cylindrical main body portion.

2. The flexible mount of claim 1, wherein the tab has at least one aperture therein for attaching the first member to the tab.

3. The flexible mount of claim 1, further including a shell surrounding the body of elastomeric material.

4. The flexible mount of claim 3, wherein the shell is fabricated of high-density polyethylene.

5. The flexible mount of claim 3, wherein the shell includes a cylindrical collar at a first end thereof having a collar axis coincident with the stud center axis and a cylindrical main portion at a second end of the shell having a main portion axis coincident with the body center axis.

6. The flexible mount of claim 3, wherein the shell includes a cylindrical main shell portion surrounding the main body portion of the elastomeric material and an auxiliary shell portion surrounding the tab.

7. The flexible mount of claim 6, wherein the tab and auxiliary shell portion have a pair of apertures therein for attaching the first member to the tab.

8. The flexible mount of claim 1, wherein the first member includes a cylindrical split tube having first and second mounting flanges having apertures therein wherein bolts extend through the apertures of the mounting flanges and the apertures in the tab to secure the first member to the tab.

9. A splash/spray control system for a vehicle, comprising:
a splash/spray control guard;
a cylindrical split tube having a pair of spaced mounting flanges each with a number of apertures therein and secured to the splash/spray control guard;
a flexible mount for resiliently securing the splash/spray control guard to the body of the vehicle wherein the guard can be deflected from an equilibrium position relative to the vehicle body in response to an applied force and wherein the guard returns substantially to the equilibrium position once the applied force is removed, the flexible mount including
an elongate stud having a center axis and having threads at one end thereof,
a cylindrical body of elastomeric material encapsulating and joined to the other end of the elongate stud, the body including a body center axis disposed at an angle with respect to the stud center axis and further including an outwardly extending tab having at least one aperture therein; and
means for fastening the guard, the split tube and stud to the vehicle body including a first fastener onto the threaded end of the elongate stud for attaching stud to the vehicle body, a second fastener extending through an aperture in the split tube and the aperture in the tab for securing the split tube to the body of elastomeric material and a third fastener extending through one of the apertures of the split tube and an aperture in the guard for attaching the guard to the split tube.

10. The splash/spary control system of claim 9, further including a spacer disposed between the body of elastomeric material and the threaded end of the elongate stud.

11. The splash/spray control system of claim 9, wherein the elastomeric material comprises polyurethane.

12. The splash/spray control system of claim 9, further including a shell surrounding the body of elastomeric material.

13. The splash/spray control system of claim 12, wherein the shell is fabricated of high density polyethylene.

14. The splash/spray control system of claim 9, further including first and second clamp plates disposed on the flanges of the split tube wherein at least two fasteners extend through the clamp plates, the flanges and the tab.

15. The splash/spray control system of claim 9, wherein the cylindrical split tube includes a pair of tube halves each having a pair of spaced flanges each with a number of apertures therein and wherein the third fastener extends through a first set of aligned apertures in the tube halves and the aperture in the guard for securing the guard between the tube halves such that a portion of such tube halves extend beyond a terminus of the guard to form an extension and wherein the second fastener extends through a second set of aligned apertures in the flanges of the tube halves and the aperture in the tube for securing the cylindrical body of elastomeric material within the tube halves.

16. The splash/spray control system of claim 15, further including a spacer disposed between the body of elastomeric material and the threaded end of the elongate stud.

17. The splash/spray control system of claim 15, wherein the elastomeric material comprises polyurethane.

18. The splash/spray control system of claim 15, further including a shell surrounding the body of elastomeric material.

19. The splash/spray control system of claim 18, wherein the shell is fabricated of high density polyethylene.

20. The splash/spray control system of claim 15, further including first and second clamp plates disposed on the flanges of the split tube wherein at least two fasteners extend through the clamp plates, the flanges and the tab.

21. The splash/spray control system of claim 15, further including a spacer plate disposed between two flanges of the tube halves.

* * * * *